United States Patent [19]

Clapp

[11] 4,018,519
[45] Apr. 19, 1977

[54] COMPOSITE PHOTOGRAPHY APPARATUS AND METHOD UTILIZING A POLARIZING BEAM SPLITTING UNIT

[76] Inventor: Roy A. Clapp, 10522 Foley Blvd., Coon Rapids, Minn. 55433

[22] Filed: Aug. 18, 1975

[21] Appl. No.: 605,596

[52] U.S. Cl. .................................. 352/89; 353/28; 354/110; 354/126
[51] Int. Cl.² .................... A63J 5/00; G03B 21/26; G03B 35/00; G03B 15/02
[58] Field of Search .......... 352/89, 45, 47; 353/28; 350/115, 117, 126; 354/126, 290, 291, 110, 202; 355/66, 43

[56] References Cited

UNITED STATES PATENTS

| | | | |
|---|---|---|---|
| 2,336,508 | 12/1943 | Smith et al. | 352/89 X |
| 2,651,233 | 9/1953 | Tondreau et al. | 354/110 |
| 2,727,427 | 12/1955 | Jenkins | 353/28 X |
| 2,727,429 | 12/1955 | Jenkins | 352/89 X |
| 3,277,782 | 10/1966 | Smith | 350/15 |
| 3,305,295 | 2/1967 | De Montremy | 352/89 X |
| 3,322,487 | 5/1967 | Renner | 352/89 |
| 3,588,219 | 6/1971 | Lusted | 350/15 |

FOREIGN PATENTS OR APPLICATIONS 660,048   5/1938   Germany .......................... 352/89

OTHER PUBLICATIONS

British Journal of Photography, vol. 112, No. 5469, May 14, 1965, Transflex, pp. 407–409.

Primary Examiner—Donald A. Griffin
Attorney, Agent, or Firm—Stuart R. Peterson

[57] ABSTRACT

A special polarizing beam splitting unit is employed in a composite photography system which utilizes an autocollimating screen having the capability of reflecting light with virtually no scatter or dispersion. A projector projects a background subject image onto the autocollimating screen, the image traversing first a path along an axis generally parallel to the plane of the autocollimating or projection screen and then by means of the polarizing beam splitting unit via a path extending along an axis normal to the plane of the projection screen. The subject is positioned between the polarizing beam splitting unit and the projection screen. A source of fill light is directed onto the subject through a washout suppression screen containing a polarizing filter oriented so that its plane of polarization is perpendicular to that of the polarization filter contained in the beam splitting unit. The suppression screen also includes an absorbing filter for attenuating visible blue light.

A camera is positioned so as to receive light that is reflected from both the autocollimating screen and the subject. The autocollimating or projection screen does not depolarize the light reflected therefrom, but the subject does so that only that portion of the reflected light residing in the plane of polarization passes through the polarizing beam splitting unit to the camera, thereby enabling the fill light to perform its intended purpose.

18 Claims, 7 Drawing Figures

U.S. Patent   April 19, 1977   Sheet 1 of 2   4,018,519
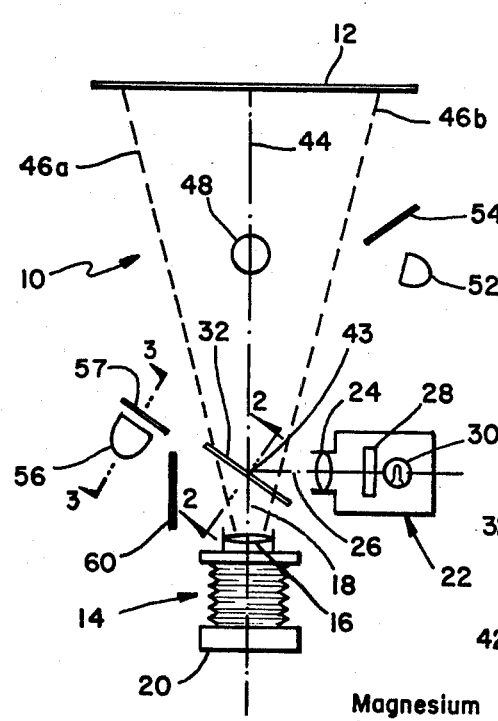
Fig 1
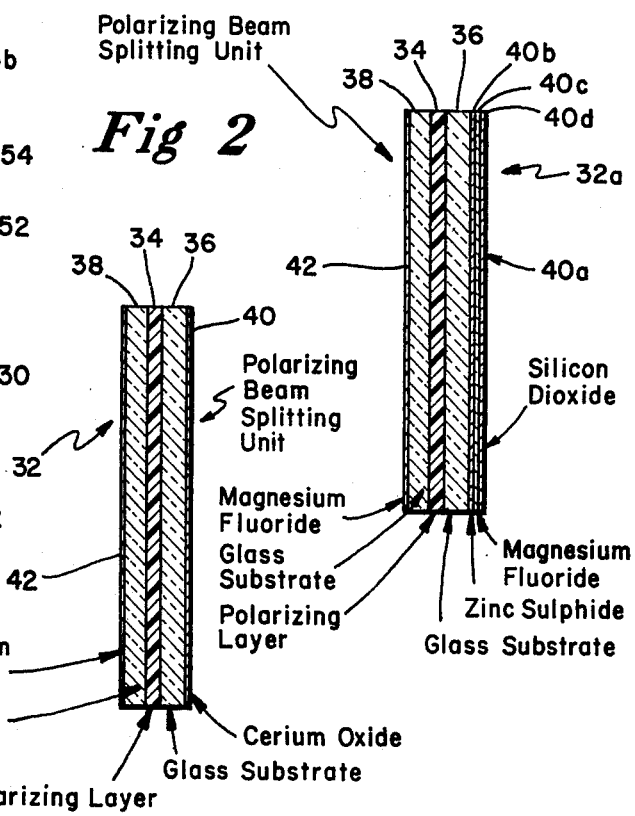
Fig 2A
Fig 2
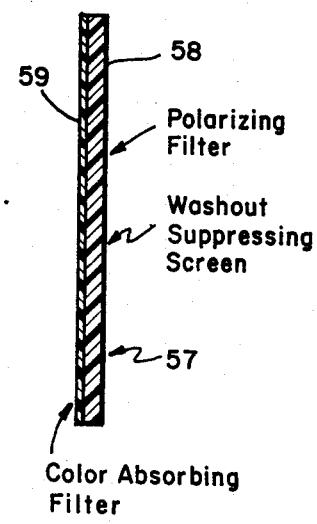
Fig 3
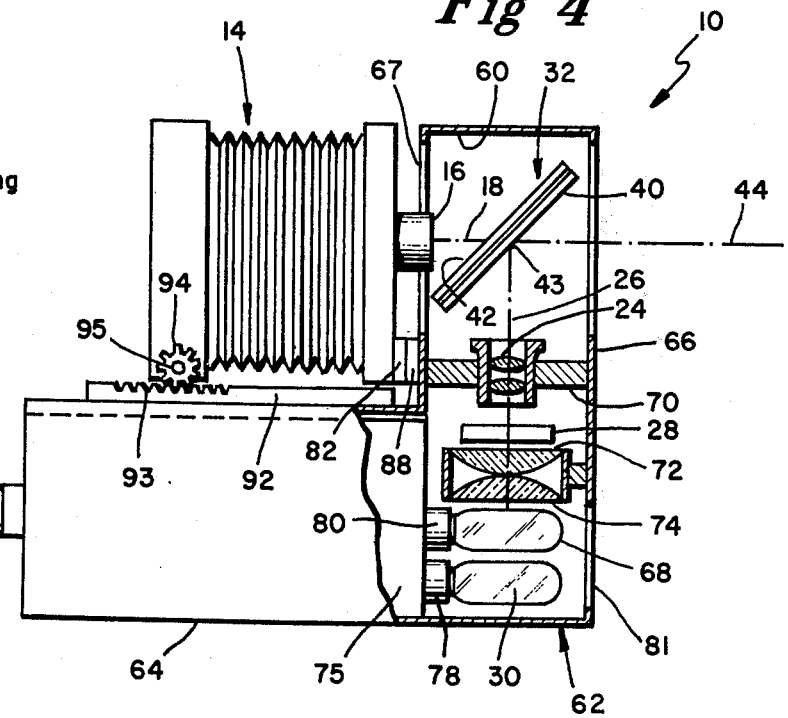
Fig 4

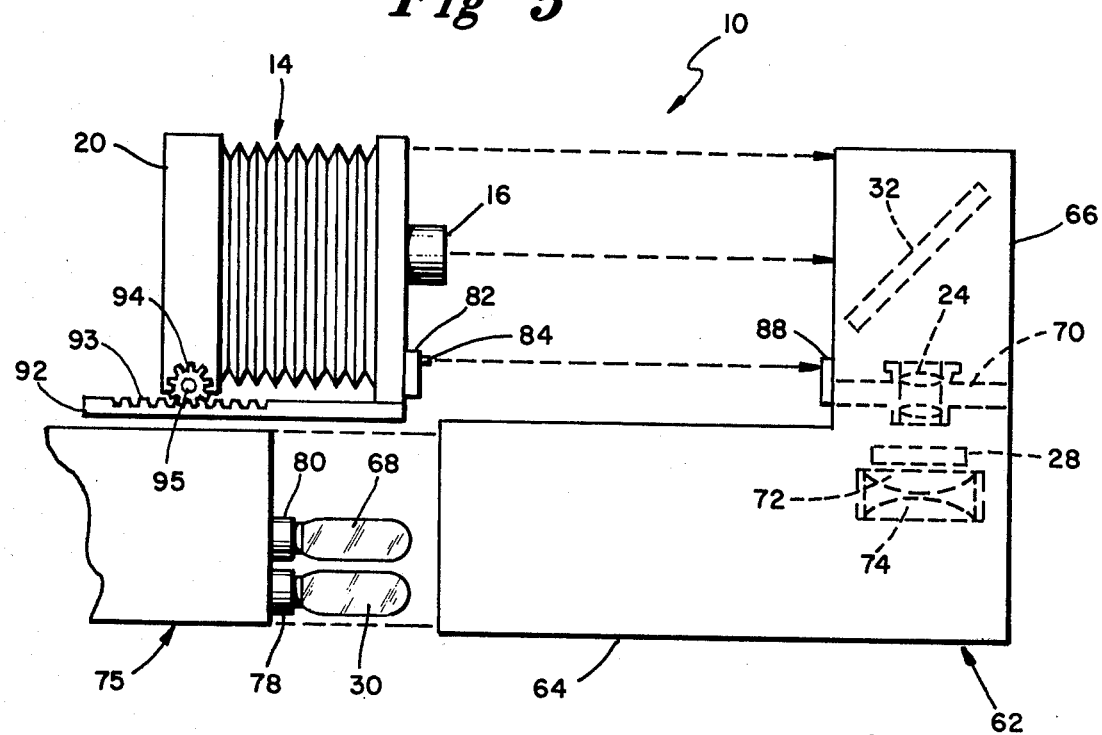
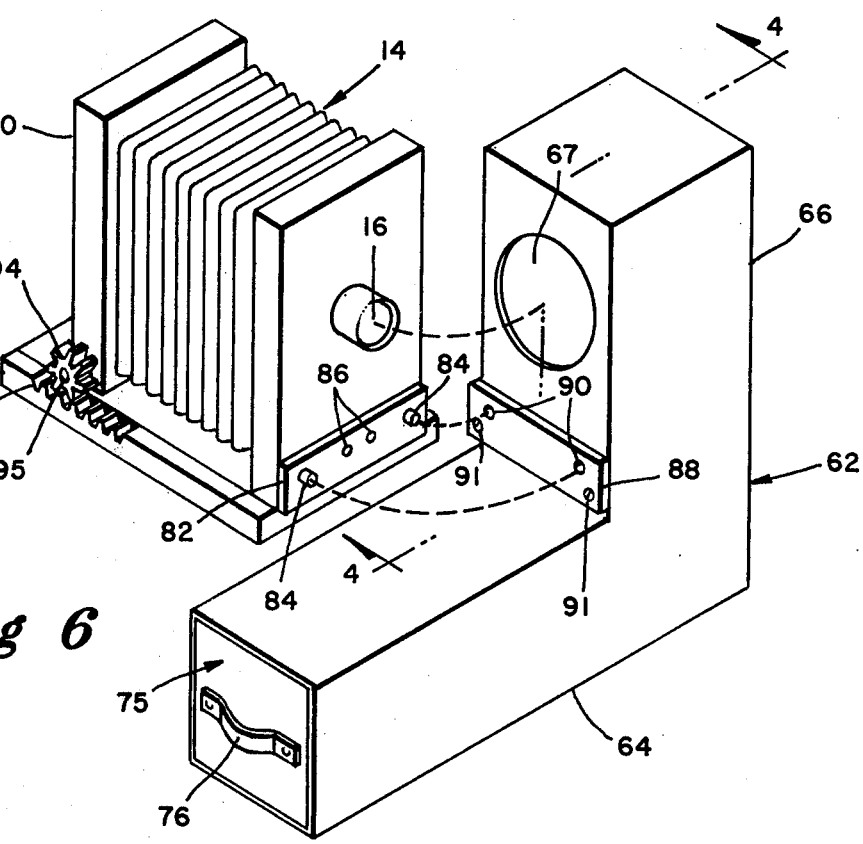

COMPOSITE PHOTOGRAPHY APPARATUS AND METHOD UTILIZING A POLARIZING BEAM SPLITTING UNIT

BACKGROUND OF THE INVENTION

1. Field of the Invention

This invention relates generally to composite photography and pertains more particularly to the apparatus and method utilizing a special polarizing beam splitter employed therein to prevent degradation of the composite image.

2. Description of the Prior Art

The front projection technique of making composite photographs is well known. Equally well known are the problems attending such a technique. Since the background image is projected onto a screen, a high intensity reflection from the screen is desired. In order to illuminate properly a subject standing in front of the screen, however, fill light is utilized. If the source of fill light is well to one side, the amount of unwanted fill light impinging on the screen can be minimized. However, when this approach is taken, the advantage of the fill light is substantially reduced, attributable largely to the failure to eliminate the shadows that the subject casts. Actually, the placing of the fill light source or sources too far to one side is apt to produce even more pronounced shadows.

Generally, the presence of flare light acts to wash out the contrast of the composite image, much like attempting to project a color slide in a lighted room. The prior art has recognized that there are two major sources of flare light. The first one is from the projector that is utilized to provide the background image. More specifically, some of the light from the projector (that which is not reflected onto the screen) passes through the beam splitter and various efforts have been made to trap this unwanted illumination so that it does not reach the camera and thereby adversely affect the composite photograph. A second major source of flare light arises because the conventional lighting used to illuminate the subject must of necessity be relatively high as far as its intensity is concerned and if this light falls on the projection screen, the projected image is washed out in proportion to the amount striking the screen.

Consequently, the fill lighting units used to illuminate the subject have heretofore been placed well off to one side. The offsetting of the subject lighting units, however, prevents the use of the normal amount of fill light that is conventionally required to prevent the casting of harsh shadows which appear in the composite photograph. Also, attempts have been made to employ screening means to block the unwanted fill light from reaching the projection screen directly. This has not proved to be effective, and becomes quite costly.

SUMMARY OF THE INVENTION

A general object of my invention is to provide a composite photograph having an overall and consistently higher quality than heretofore.

Inasmuch as one of the difficulties entering into the making of good composite photographs has been the washing out of the background image, an object of the present invention is to minimize such degradation. More specifically, an aim of the invention is to employ fill light for supplementally illuminating the subject without having that portion of the fill light that strikes the projection screen having the background image displayed thereon reflect such light back to the camera. By so doing, the fill light reduces the presence of harsh shadows as far as the subject is concerned, yet maintains a high degree of contrast between the subject and the background image. Consequently, when practicing my invention the resulting photograph will possess a high degree of realism not heretofore experienced, even though the background in the photograph is derived from only a projected image and not an actual background scene.

In the achieving of the general object of making higher quality composite photographs, the invention also effectively eliminates unwanted flare light and the accompanying objectionable reflections that such flare light causes. Prior art attempts have been made to reduce the amount of flare light, but the usual procedure is to resort to fairly complicated light traps that are not only costly but occupy a considerable amount of space. Hence, not only is it within the purview of the present invention to eliminate light traps as such, but also to provide apparatus for making composite photographs that will be exceedingly compact and portable.

Still another object is to provide apparatus that is relatively inexpensive to manufacture, in many instances being less costly than the more elaborate equipment that has previously been employed.

Yet another object of the invention is to suppress undesirable blue light so that such light does not adversely affect the composite photograph.

Briefly, my invention makes use of an autocollimating screen having the known capability of not scattering reflected light. By means of a beam splitter, an image received from a projector is reflected along a path normal to the autocollimating screen, then reflected back along the same path, and finally through the beam splitter into the camera. The beam splitter constitutes a unit that not only provides the beam splitting function but also performs a polarizing role as well. By using a source of fill light that is transmitted through a washout suppression screen having the capability of polarizing light at right angles to the plane of polarization of the layer between the two glass substrates of the polarizing beam splitting unit any fill light that strikes the autocollimating or projection screen is reflected from this screen in the same plane in which it is received from the fill light source and is in this way blocked from passing through the polarizing beam splitting unit to the camera. Yet the fill light performs its expected function in that the polarized fill light impinges upon the subject to reduce the shadows that would otherwise prevail, the subject, unlike the projection screen, dispersing the light striking it into various planes so that some of the light reflected from the subject, that portion which is in the plane of polarization of the polarizing layer contained in the polarizing beam splitting unit, is transmitted through the polarizing beam splitting unit to the camera. The suppression screen also includes a filter for absorbing visible blue light so that such unwanted light does not appear in the composite photograph.

BRIEF DESCRIPTION OF THE DRAWINGS

FIG. 1 is a diagrammatic representation of apparatus exemplifying the making of a composite photograph in accordance with the teachings of my invention;

FIG. 2 is a sectional view taken in the direction of line 2—2 of FIG. 1 for the purpose of showing one construction for the composite polarizing and beam splitting unit;

FIG. 2A is a view similar to FIG. 2 but depicting a modified version of the polarizing beam splitting unit;

FIG. 3 is a sectional view taken in the direction of line 3—3 of FIG. 1 in order to illustrate the construction of the washout suppression screen;

FIG. 4 is a side elevational view of a combined camera and projector constructed in accordance with my invention, the projector being shown in section taken along the line 4—4 of FIG. 6 but with the camera in its picture-taking position;

FIG. 5 is an exploded view corresponding to FIG. 4 for the purpose of showing to better advantage the several components and the manner they are assembled to form the unitized arrangement depicted in FIG. 4, and FIG. 6 is a perspective view of the camera shown in a mythical open face relation with the housing for the purpose of illustrating the manner in which the camera is detachably connected to the housing.

DESCRIPTION OF THE PREFERRED EMBODIMENT

To fully appreciate the benefits to be derived from my invention, it is believed best to refer first to FIG. 1 in which a system or apparatus 10 for making composite photographs has been diagrammatically presented in its entirety. The system or apparatus 10 makes it possible to photograph a subject against a background provided by a projected image from an appropriate transparency, thereby giving the appearance in the composite photograph that the subject was photographed in the actual environment represented on the transparency. The present invention embodied in the system 10 is an improvement over the apparatus described in U.S. Pat. No. 2,727,427 granted on Dec. 20, 1955 to Will F. Jenkins titled "APPARATUS FOR PRODUCTION OF LIGHT EFFECTS IN COMPOSITE PHOTOGRAPHY."

The improved apparatus represented by what is schematically portrayed in FIG. 1 is made possible by the availability of autocollimating screen material, such as that marketed by Minnesota Mining and Manufacturing Company of St. Paul, Minnesota, which has the remarkable property of reflecting light over identically its incident path back toward the light source with almost no scatter or dispersion. A screen utilizing the autocollimating material just alluded to has been labeled 12 in FIG. 1 and will hereinafter for the sake of succinctness be referred to as a projection screen.

Although basically of conventional construction, a camera 14 is also included in the system 10. Thus, the camera 14 includes a lens 16 having an optical axis 18 that is generally perpendicular or normal to the plane of the projection screen 12. Also included in the camera 14 is a film holder 20. As already explained, though, the camera 14 is of conventional construction, although the exterior thereof is modified in the manner illustrated in FIGS. 4, 5 and 6 which will be referred to later on.

At this time, attention is directed to an image projector 22, also of conventional construction, having a lens 24 oriented along an optical axis 26. The optical axis 26 is generally parallel to the plane of the projection screen 12. Within the projector 22 is a slide transparency holder 28 and a lamp 30 which supplies the illumination for a transparency held in the holder 28 and which is projected onto the screen 12 in a manner presently to be described.

Playing a very important role in the practicing of my invention is a polarizing beam splitting unit denoted generally by the reference numeral 32. From FIG. 2, it can be discerned that there is a central layer 34 of polarizing material. The polarizing layer 34 is sandwiched between two transparent substrates 36, 38, the substrate in each instance being made of glass and having optically polished flat surfaces that are parallel to each other.

A reflection-enhancing coating 40 is applied to the other surface of the substrate 36 of the unit 32 constituting a thin layer 40 of cerium oxide deposited on the substrate 36, the coating 40 having a quarter wavelength thickness. Although it will become clearer later on, the polarization plane of the layer 34 is oriented in a direction which enhances the reflectivity of the coating 40. The coating 40, it can be explained, can readily be deposited onto the glass substrate 36, the deposition being done in a vacuum chamber; vacuum chambers have already been successfully employed for this purpose. The other substrate 38 is coated with an anti-reflection layer 42, also having a quarter wavelength thickness, of magnesium fluoride. It perhaps should be explained that the two glass substrates 36, 38 are first coated with the reflection-enhancing coating 40 in one instance and the anti-reflection coating 42 in the other. They are then cemented together with the sheet or layer 34 of polarizing material therebetween so that all of the components constituting the unit 32 are bonded together by means of optical cement.

Cerium oxide, which constitutes the coating 40 in the polarized beam splitting unit 32 of FIG. 2, is more difficult to work with than zinc sulphide. Zinc sulphide, on the other hand, is not as resistant to scratching, thereby making it more difficult to handle. In view of these differences, a modification of the polarized beam splitting unit 32 of FIG. 2 has been presented in FIG. 2A, being denoted generally by the reference numeral 32a. The unit 32a has a reflection-enhancing coating 40a composed of a thin layer 40b of zinc sulphide deposited on the glass substrate 36 which is the same as in the unit 32, an additional layer 40c of magnesium fluoride serving as a spacing layer between the zinc sulphide layer 40b and a third or outer layer 40d of silicon dioxide. Each of the layers 40b, 40c and 40d is of a quarter wavelength thickness. It will be appreciated that in this instance there are actually two rugged protective layers (the layers 40c and 40d); however, the hard insoluble layer 40d, being the outer layer, affords the primary assurance that a high coating reflectivity will be preserved.

Both of the polarizing beam splitting units 32, 32a are described and claimed in my copending application titled "POLARIZING BEAM SPLITTING UNIT," Ser. No. 605,267, filed Aug. 18, 1975, now U.S. Pat. No. 3,985,425.

It is important to appreciate that the composite polarizing beam splitting units 32 and 32a when constructed as just explained are optically equivalent to a single element of approximately one index of refraction throughout; hence, the units 32, 32a do not have any significant internal reflections which adversely affect the quality of the composite photograph. At this time, it will simply be mentioned that the plane of polarization of the layer 34 in the units 32, 32a is quite important and is related to the plane of polarization of another polarizing screen or filter yet to be described.

Although beam splitters are quite well known, it should be stressed that a conventional beam splitter used in a front projection system is of the dichroic type produced by the same vacuum deposition that has been alluded to in the making of the units 32, 32a. In the making of a conventional beam splitter, high and low index materials are deposited upon the substrate, usually glass. However, it has been necessary to use multiple coatings in order to construct a beam splitter in which the reflectivity and transmission are in a desirable ratio, commonly approximately 50% transmitting and 50% reflecting. A shortcoming of such a coating arrangement, when employed at angles such as 45°, is that there is exhibited a difference in reflectivity as far as polarized light is concerned. The present invention, it is to be appreciated, makes use of polarized light and thus the units 32, 32a, when constructed as described, are quite important to a practical utilization of my invention. Also, a disadvantage of multiple coatings, as employed in the past, is to produce a beam splitter that is more selective in terms of color, the more coatings that are used causing a proportional greater increase in the selectivity. The more neutral a beam splitter is, the better it becomes as far as the making of color pictures is concerned.

Consequently, it is important to understand that the polarizing beam splitting unit 32 or 32a reduces the number of air-immersed surfaces in the complete system and thus minimizes the unwanted reflections at the boundaries between air and a material having a higher index of refraction. Still further, a beam splitter having fewer layers makes the beam splitter easier to manufacture, lowers its cost and also contributes to the ease in which the desired neutral color can be controlled or obtained. Thus, the units 32, 32a are substantially of the same index of refraction and therefore do not produce the undesirable surface reflections at either the front or back surfaces of the polaroid material. The coating 40 or 40a, as the case may be, on the front surface of the substrate 36, this being the reflective-enhancing coating, and the correspondingly coating 42 on the second surface of the other glass substrate 38, this being the anti-reflection coating, produces an assembly functioning as a single reflecting surface, thereby avoiding the formation of double images. There is another distinct advantage to be derived from employing the polarizing beam splitting units 32, 32a which is better reserved for discussion when referring to the use of so-called fill light. Therefore, it is believed that a full understanding and appreciation of the benefits to be gained from using either the unit 32 or 32a will become even more apparent as the description progresses.

Both the optical axis 18 and the optical 26 have been mentioned. It is obvious from FIG. 1 that the optical axis 26 is generally perpendicular to the axis 18, the two intersecting at a locus 43 provided by the reflection-enhancing coating 40 of the polarizing beam splitting unit 32. Since the unit 32 is oriented at 45°, the two intersecting optical axes 18, 26 are then combined into a single or common axis 44 which is normal or perpendicular to the plane of the projection screen 12. Consequently, the light traversing the optical path 26 is directed by the polarizing beam splitting unit 32 in a direction normal or perpendicular to the plane of the screen 12, the common axis or path having been given the reference numeral 44, as mentioned above. The boundaries of the projected image supplied by the projector 22 and the field of view of the camera 14 are preferably of the same angular extent, the limits of this field having been denoted by the reference numerals 46a and 46b for the sake of completeness.

Since the goal of composite photography is to provide a photograph containing a foreground subject depicted against a background scene provided by a projected image, whatever subject that is to appear in the composite photograph must, quite obviously, be located between the projection screen 12 and the polarizing beam splitting unit 32. In many instances the subject is a human being, but for the sake of simplicity a sphere 48 has been selected as the subject in this instance.

In order to provide conventional illumination for the subject 48, various lighting units such as floor stand lamps may be used. For instance, a main or key light source 52 can be placed at a suitable distance from the subject 48 and an opaque screen or shield 54 positioned so as to block any direct illumination from the key light source 52 from falling on the projection screen 12. Quite obviously, the key light source 52 must be at a considerable distance to one side of the subject 48 or else the opaque screens 54 will not protect the projection screen 12 from receiving light rays directly from the key light source 52. Owing to the considerable angle that must be employed, it follows that the light from the key light source 52 impinges on the subject 48 at an appreciable angle with respect to the common axis 44. It is this key light source 52 that produces, in many instance, rather severe shadows, the severity of course depending upon the type of subject 48. As far as live subjects are concerned, the shadow problem becomes quite pronounced, a person's nose, for instance, aggravating the situation.

To overcome the shadow problem, the present invention contemplates a fill light source 56 utilizing a washout suppression screen 57 via which the light from the source 56 must pass in order to provide a soft general illumination of the subject 48 and thus reduce the shadow effect produced from the main or key light source 52. From FIG. 1 it will be discerned that the source 56 is arranged so that it impinges on the subject 48 at an acute angle of approximately 30° with respect to the axis 44. Owing to this acute angle, an appreciable amount of light not intercepted by the subject 48 strikes the projection screen 12, but does not reach the camera 14 as will become apparent below. It will be understood that controlled shadows are acceptable and indeed are quite desirable in many instances in order to portray more realistically the subject. It is the ability to control adequately the length and opacity of the shadows that is important in composite photography and which control is adequately supplied by means of the apparatus and method constituting the instant invention.

Having mentioned the washout suppression screen 57, which is in front of the fill light source 56, it should be pointed out that this screen 57 includes a polarizing filter 58. It can now be appreciated that the filter 34 (the polarizing layer in the units 32 or 32a) and the filter 58 (which has just been mentioned) have their polarization planes at right angles to each other. In this way, whatever light supplied by the fill light source 56, although striking to some degree the projection screen 12, is not dispersed or scattered by the screen 12 owing to its autocollimating properties. Thus, the reflected light from the screen 12 is in the same plane as the incident light impinging thereon. By orienting the polarization plane of the layer 34 in the polarizing beam splitting unit 32 or 32a at right angles or perpendicular to the polarization plane of the filter 58, then any light reflected from the screen 12 that originates from the source 56 will be blocked by the filter layer 34 and will not pass to the camera 14 and thus will have no effect on the film contained in the holder 20.

In addition to the polarizing filter 58, the washout suppression screen 57 also comprises a color absorbing filter 59 which attenuates ultraviolet and blue light at the far end of the visible spectrum. In practice, the filter 59 can constitute either gelatin or acetate sheet, such as that developed for use in theatrical lighting, tinted with a dye producing a very pale straw color which transmits all the light in the visible spectrum, while attenuating the ultraviolet and the visible blue light of this end of the spectrum.

The desirability of attenuating or blocking both ultraviolet and the extreme blue end of the visible spectrum may not be readily apparent. In this regard, it can be explained that crossed polarized filters, such as those labeled 34 and 58, do not completely extinguish all visible light, permitting instead a portion of the deep blue end of the spectrum to pass through both layers 34 and 58 constituting the crossed filter pair in this instance. Unfortunately, the strobe flash units that are commonly used in most portrait studios today generate illumination rich in ultraviolet and far blue energy. If only the polarizing filter or single layer 58 is employed, the major portion of the visible light is suppressed; nevertheless, a small amount of visible blue is permitted to pass. This has the objectionable effect of slightly modifying the colors of the projected background, imparting a relatively slight bluish tint to the background image which, of course, detracts from the natural coloring of the background or projected image.

Furthermore, it is also well known that many laundry detergent compounds contain fluorescent materials for the purpose of making fabrics washed therein appear whiter. When a subject wearing such fabrics as clothing is photographed under strobe lighting, a bluish light will be emitted, which is obviously another disadvantage.

Consequently, by incorporating the color absorbing filter 59 in the washout suppression screen 57, it serves to eliminate both of the two undesirable effects just mentioned.

It is not necessary to use a separate color filter, as such, in conjunction with the composite beam splitter 32 or 32a, because the reflection-enhancing coating 40 can be designed to reduce the unwanted portion of the spectrum. Furthermore, while the projector 22 utilizes the flash tube or strobe light source 30, the light from this source passes through the condensing lenses 72, 74, as well as the projection lens 24, and by choosing suitable glass types, the ultraviolet can be attenuated. The beam splitting unit 32 (or 32a) by reason of its dichroic coating requires no color filtering. Thus, it is only in connection with the screen 58 that the blue filtering is needed.

Whereas the projection screen 12 is completely specular and does not depolarize any of the reflected light originating from the fill light source 56, so that it cannot pass to the camera 14 as explained above, the situation is much like that where there is no fill light at all. The purpose of utilizing fill light, as already pointed out, is to illuminate to better advantage the subject 48, doing so as far as the camera 14 is concerned because the subject depolarizes the illumination from the fill light source 56, the subject 48 not being specular as is the projection screen 12. Consequently, the fill light reflected from the subject 48, or at least that portion in the polarization plane of the layer 34, is transmitted back through the entire unit 32, then entering the lens 16 of the camera 14 so as to impinge on the film held by the holder 20.

Recapitulating for a moment, the projection screen 12 receives the background image supplied by the projector 22 and displays whatever scene is on the transparency held in the slide holder 28. There is no so-called washing out of the projected image because the key light source 52 is shielded by the opaque screen 54, light therefrom not being directed onto the projection screen 12. On the other hand, the projection screen 12 does receive light from the fill light source 56 but any reflected light is obstructed by reason of the difference in polarizing planes between that of the filter material 34 and that of the filter 58. Even though the illumination falling on the subject 48 has been polarized by reason of the screen 58, the reflected light from the subject 48 is not polarized, or at least enough light is dispersed into the plane of polarization provided by the layer 34 so that the camera 14 receives such light and records the subject as the photographer determines that it should be.

The photographer is given considerable leeway and can decide what lighting effects are best for the particular composite photograph that he desires to make. He can do this without as much experimentation as in the past, for he knows that the fill light reflected from the screen 12 will not reach the camera 14 but only from the subject 48 as is intended. Because of this, a considerable amount of time is saved in making a composite photograph and the high level of quality makes it such that fewer negatives need be made with the assurance that they will faithfully reproduce what is wanted. The specific procedures to be followed will soon be presented. However, at this point it can be mentioned that, in prior art arrangements, a tedious trial and error technique usually had to be resorted to, thereby not only wasting time in making the photographs but also requiring that a sizable number of photographs be made in order to get one that would be satisfactory.

Although the benefits of using a beam splitter constructed in the manner in which the polarizing beam splitting unit 32 or 32a is fabricated have been mentioned, it may not be completely obvious as to the extensiveness of the benefits to be derived from using such a filter unit 32 or 32a. Polaroid material, such as that constituting the intermediate layer 34 in the units 32, 32a, has a certain parasitic loss, the material acting as a neutral density filter. A perfect or ideal polarizer would reduce the light energy to 50% of its original value. However, polaroid material actually transmits only about 35 to 38% of the incident light energy. The present invention makes use of this property, which has heretofore been regarded as undesirable, to gain an important advantage. Basically, this important advantage resides in the fact that the light from the projector 22 that is not reflected by the reflection-enhancing coating 40 or 40a passes through the entire unit 32 or 32a, being attenuated by the neutral density action of the polaroid material 34 as it first passes through.

Recognizing that some light does indeed pass through the unit, the system 10 of FIG. 1 makes use of a light absorbing plate 60 which has been shown as an independent element in FIG. 1, but which is actually a portion of a housing yet to be described. Even though the light absorbing plate 60 is black, there is still some reflection (because it is not totally absorbent) and what light is reflected from the plate 60 strikes on its return path the anti-reflection coating 42. Consequently, the light that is reflected from the absorbing plate 60 must then pass through the polaroid material or layer 34 a second time to reach the reflection-enhancing coating or surface 40 (or 42a), thereby further reducing or attenuating the unwanted light energy that has originated from the projector 22.

Still further, that portion of the light energy that has passed through the layer 34 in a reverse direction is reflected by the coating 42, that is reflected by the side thereof confronting the glass substrate 36, and then passes for a third time through the polaroid material or layer 34 with still additional reduction in the light intensity before being directed to the camera lens 16. Thus, whereas prior art devices have had to make use of complicated light traps in order to reduce the energy that has just been mentioned, the present invention only requires a simple black surface, such as the light absorbing plate 60. By disposing the polarization plane, as hereinbefore mentioned, in a direction so as to enhance the reflectivity of the coating 40 (or 40a), the amount of light energy transmitted through the laminations 40 (or 40a), 36, 34, 38 and 42 to the plate 60 is reduced to begin with, thereby further contributing to the efficiency and effectiveness of the unit 32 (or 32a). Of course, the polarization plane of the layer 34 is maintained in use at right angles to the polarization plane of the filter 58 of the screen 57.

In order to demonstrate just how simple and compact a practical version of the apparatus utilized in the system 10 can be, FIGS. 3, 4 and 5 have been presented. It will be observed that an L-shaped enclosure or housing 62 is employed, the housing 62 having a horizontal leg 64 provided with a rectangular cross section and a vertical leg 66 also formed with a rectangular cross section, the back side of the vertical leg 66 being open at 67 for accommodating the camera lens 16. The light absorbing plate 60 in the practical structure in FIGS. 3–5 is merely the roof or top of the vertical leg 66, being integral with the upper edges of the side walls between which the unit 32 is supported. Since it performs the same function in FIGS. 3–5 as in FIG. 1, the same reference numeral is employed in both instances. It might be pointed out at this stage that, wherever possible, identical reference numerals are used even though their physical appearance and location may differ somewhat from the highly diagrammatic system 10 portrayed in FIG. 1.

The lamp 30 in the projector 22 has already been mentioned. This lamp also appears in FIG. 3. Actually, nearly all portrait photography nowadays utilizes electronic flash techniques for lighting the subject. Therefore, the lamp 30 constitutes a flash tube for making the actual exposure. In order to provide light for focusing and composing the background, however, an incandescent lamp 68 is arranged just above the flash tube 30. It will be appreciated that since the envelope of the incandescent lamp 68 is clear or transparent, the light from the flash tube or lamp 30 can pass freely upwardly through the incandescent lamp 68 used for focusing.

A fixed plate 70 within the vertical leg 66 of the enclosure 62 supports the lens 24 for the projector 22. The mount for the projection lens 24 is preferably mounted on or in the plate 70 by screw threads so that rotation of the lens 24 will permit the raising or lowering of it in order to focus the slides contained in the slide transparency holder 28. From FIG. 3 it will be seen that the slide holder 28 is disposed beneath the lens 24 but above a pair of condensing lenses 72, 74. Lens arrangements, such as that only generally described, are quite common and any detailed description is believed to be unnecessary.

A feature of the invention, however, resides in the fact that the power supply for the lamps 30, 68, together with the electronic synchronizing and trigger circuitry therefor, can all be housed within a modular unit 75, as best seen in FIG. 4. This module 75, is adapted to slide into the horizontal leg 64 of the enclosure 62, a handle 76 enabling this to be done. Sockets 78 and 80 are provided for the accommodation of the lamps 30, 68. In this way, all of the wiring can be bench-assembled.

Furthermore, being unitized, the modular unit 75 can be serviced quite easily because a photographer on location can carry a spare module 75, and if need be, take only a moment or two to change modules. At the same time, since both the flash lamp 30 and the focusing lamp 68 have a limited useful life, access through an opening 81 in the front of the horizontal leg 64 can permit the changing of either without even removing the module 75, even though the removal of the module 75 is certainly a simple and straightforward task.

Concentrating now on FIG. 5, it will be seen how the camera 14 is adapted so as to permit its use as a front projection unit. In this regard, the camera 14 is provided with a plate 82 having two spaced dowel pins 84. The plate 82 can be secured to the casing of the camera 14 in any suitable manner, such as by screws 86. The L-shaped enclosure 62 is likewise provided with a plate 88 having two holes 90 that are registrable with the pins 84. The plate 88 can be secured to the vertical leg 66 in any suitable manner, such as by screws 91. In initially aligning the equipment, one or both of the plates 82, 88 can be shifted laterally before securing it in place, doing so until the camera lens 16 is properly positioned within the open side 67 along its axis 18, and also with respect to the axis 26 of the projector 22 so that both of these axes 18, 26 thus intersect at the proper point 43 on the reflective coating 40 of the unit 32.

After preadjusting or aligning the equipment as outlined above, the plates 82, 88 can then be secured in their adjusted relationship so that thereafter the camera 14 can be removed from the enclosure 62 and replaced with its optical axis 18 always in alignment with the common axis 44 and of course in the proper intersecting relationship at 43 with the axis 26 of the lens 24. In other words, no need exists for any readjustment each time the camera 14 is mounted. The dowel pins 84 insure proper re-alignment once proper alignment has initially been achieved.

It should be noted that the lens 16 for the camera 14 is fixedly located, once adjusted, because of the plates 82 and 84. However, the rear, that is its film holder 20, of the camera 14 is supported on a base plate 92 so that it can be moved closer or farther from the lens 16 in order to focus the composite image on the film held in the holder 20. While various expedients can be used for moving the rear of the camera, a simple rack 93 at each side and a pair of pinions 94 are used in the illustrated instance, the racks 93 being integral with the base plate 92. The pinions 94 are mounted at opposite ends of a shaft 95 and can be rotated by a knob (not shown) on either end of the shaft 95, the knob enabling the proper positioning of the film holder 20 in relation to the lens 16.

While it is recognized that various photographers might very well elect to employ somewhat different procedures, the detailed method of using the apparatus that has been hereinbefore generally referred to would be to first conduct a limited amount of testing in order to determine the proper balance of lighting between the background image displayed on the screen 12 and the subject 48 in order to procure a natural overall effect. Having done this, the photographer would then choose suitable distances for the camera 14, the subject 48 and the screen 12 in accordance with the particular focal length of the lenses 16 and 24. In general, the subject 48 can be located approximately four feet in front of the autocollimating projection screen 12 and the unit shown in FIGS. 3–5 comprising the camera 14 and enclosure 62 placed a suitable distance in front of the subject 48, this distance being approximately four feet.

After setting up as just described, the photographer would place a slide or transparency in the holder 28 of the projector 22 and make a series of test negatives at various lens stops. Experience has shown that, if a range between f/5.6 and f/16 are chosen for this experimental series, the result should provide an ample range. The desired density is chosen by examining the negatives after the film is processed and the lens stop set at the indicated value. Even though these preliminary shots are made, it will be appreciated that the number of test negatives is appreciably reduced as compared to prior art techniques.

After making the series of test negatives, the subject 48 is then positioned between the camera 14 and the projection screen 12, the subject lighting then being adjusted by a combination of varying the light intensities of the lamp sources 52 and 56 (plus any others that are used). This is usually done either by adjusting the intensities of the lamps themselves or by moving the lamps closer or farther from the subject 48. Making a series of exposures with the subject 48 located in relation to the projected image on the screen 12 is a routine matter after having viewed the prints made from the test negatives. The photographer then selects the optimum lighting arrangement that gave the desired match between the subject illumination and the background illumination. Once these conditions are established, this data can be recorded and the same conditions duplicated or reproduced at will without going through the preliminary steps just mentioned. Having established the conditions, as mentioned above, then it is believed evident that a composite photograph possessing superior qualities can be made without any background washing out and without objectionable reflections from stray light appearing in the composite photographs.

I claim:

1. Apparatus for composite photography comprising an autocollimating screen having a planar right reflecting surface facing including a first lens having its axis approximately normal to the plane of said screen, a projector positioned in close proximity to said camera and including a second lens having a second axis for projecting a background image from said projector along said second axis, said second axis intersecting said first axis at a given locus, beam splitting means positioned at said locus for reflecting at least a portion of said background image from said second axis along said first axis toward said screen light reflecting surface, means for directing polarized light lying in a first polarized plane onto a subject located between said beam splitting means and said screen to provide fill light to minimize shadows, said subject dispersing the light striking it into various planes, and polarizing means between said beam splitting means and said camera for transmitting through said first lens to said camera only light reflected from said screen and said subject lying in a second polarized plane generally perpendicular to said first plane of polarized light directed onto said subject.

2. Apparatus in accordance with claim 1 in which said beam splitting means and said polarizing means constitute a single unit.

3. Apparatus in accordance with claim 2 in which said unit comprises a transparent substrate, said beam splitting means constituting a coating of reflection-enhancing material on the side of said substrate disposed nearer said screen and subject, and said polarizing means constituting a layer of polarizing material on the side of said substrate nearer said camera.

4. Apparatus in accordance with claim 3 in which the polarization plane of said layer is oriented in a direction to enhance the reflectivity of said coating.

5. Apparatus in accordance with claim 3 in which said first and second axes intersect at a locus on said coating at generally right angles and the angle of said beam splitting-polarizing unit is approximately 45° with respect to each of said axes.

6. Apparatus in accordance with claim 5 in which said unit additionally includes a second transparent substrate adjacent the side of said polarizing layer nearer said camera and a coating of anti-reflection material on the side of said second substrate nearer said camera.

7. Apparatus in accordance with claim 6 in which said reflection-enhancing coating contains a material selected from the group consisting of cerium oxide and a zinc sulphide and said anti-reflection coating and contains magnesium fluoride.

8. Apparatus in accordance with claim 7 in which the polarization plane of said polarizing layer is oriented in a direction to increase the reflectivity of said reflection-enhancing coating.

9. Apparatus in accordance with claim 6 in which said reflection-enhancing coating contains zinc sulphide, magnesium fluoride and silicon dioxide, said zinc sulphide being contiguous, said second substrate and said magnesium being between said zinc sulphide and said silicon dioxide.

10. Apparatus in accordance with claim 1 including means associated with said means for directing polarized light onto a subject for absorbing ultraviolet and blue light at the far end of the visible spectrum.

11. Apparatus in accordance with claim 10 in which said last-mentioned means and said means for directing polarized light onto a subject constitute a composite screen, and a conventional photographic unit, said composite screen being between said conventional photographic unit and said subject.

12. A composite photography method comprising the steps of projecting a background image onto an auto-collimating screen along an axis generally normal to the surface of said screen, directing polarized light lying in a first polarized plane onto a subject in front of said screen, and transmitting light reflected from said subject and said screen to a camera in a second polarized plane generally perpendicular to said first polarized plane directed onto said subject, thereby preventing any of said polarized light reflected from said screen in said first polarized plane from reaching said camera.

13. A method in accordance with claim 12 in which said background image is first directed along an axis generally at right angles to said normal axis and said polarized light lying in said first polarized plane is directed onto said subject at an acute angle with respect to said normal axis.

14. A method in accordance with claim 13 in which said acute angle is approximately 30° with respect to said normal axis.

15. A method in accordance with claim 12 in which said light reflected from said subject and said screen is transmitted through a polarizing beam splitting unit comprising a layer of polarizing material disposed in said second plane generally perpendicular to said first plane of polarized light directed onto said subject, said material being sandwiched between two glass substrates, one of which has a coating of reflection-enhancing material toward said screen and the other of which substrate has a coating of anti-reflection material toward said camera.

16. A method in accordance with claim 15 in which said reflection-enhancing coating contains a material selected from the group consisting of cerium oxide and zinc sulphide and said anti-reflection coating contains magnesium fluoride.

17. A method in accordance with claim 15 in which said reflection-enhancing coating contains zinc sulphide, magnesium fluoride and silicon dioxide, said zinc sulphide being adjacent said one substrate and said magnesium fluoride being adjacent said zinc sulphide.

18. A method in accordance with claim 12 including the step of attenuating ultraviolet and blue light at the far end of the visible spectrum from the polarized light directed onto the subject.

* * * * *

UNITED STATES PATENT OFFICE
CERTIFICATE OF CORRECTION

Patent No. 4,018,519      Dated April 19, 1977

Inventor(s) Roy A. Clapp

It is certified that error appears in the above-identified patent and that said Letters Patent are hereby corrected as shown below:

Column 11, line 66, "right" should be --light--; line 67, after "facing" insert --a camera--.

Signed and Sealed this twenty-sixth Day of July 1977

[SEAL]

Attest:

RUTH C. MASON
*Attesting Officer*

C. MARSHALL DANN
*Commissioner of Patents and Trademarks*